US009723434B1

(12) United States Patent
Chang et al.

(10) Patent No.: US 9,723,434 B1
(45) Date of Patent: Aug. 1, 2017

(54) INFORMATION HANDLING SYSTEM PROXIMITY SENSING

(71) Applicant: Dell Products L.P., Round Rock, TX (US)

(72) Inventors: Ching-Wei Chang, New Taipei (TW); I-Yu Chen, Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/162,738

(22) Filed: May 24, 2016

(51) Int. Cl.
*H04B 5/00* (2006.01)
*H04W 4/00* (2009.01)
*H04W 8/00* (2009.01)

(52) U.S. Cl.
CPC .............. *H04W 4/008* (2013.01); *H04B 5/00* (2013.01); *H04W 8/005* (2013.01)

(58) Field of Classification Search
CPC .............. H04B 5/0025; H04B 5/0075; H04L 2012/2841; H04Q 2209/47
USPC ................................................ 455/41.1, 41.2
See application file for complete search history.

(56) References Cited

U.S. PATENT DOCUMENTS

| 2002/0107968 | A1* | 8/2002 | Horn | H04L 12/1881 709/230 |
| 2004/0047324 | A1* | 3/2004 | Diener | H04L 1/1664 370/338 |
| 2007/0004419 | A1* | 1/2007 | Ji | H04W 72/1231 455/447 |
| 2008/0293353 | A1* | 11/2008 | Mody | H04K 3/226 455/1 |
| 2009/0082031 | A1* | 3/2009 | Kim | H04W 72/1263 455/452.2 |
| 2010/0105332 | A1* | 4/2010 | McHenry | H04W 16/14 455/62 |
| 2010/0173586 | A1* | 7/2010 | McHenry | H04L 27/0006 455/62 |
| 2012/0302190 | A1* | 11/2012 | McHenry | H04B 17/382 455/226.3 |
| 2013/0241864 | A1* | 9/2013 | Chen | G06F 3/0418 345/174 |
| 2014/0078094 | A1* | 3/2014 | Yang | G06F 3/0418 345/174 |
| 2014/0187153 | A1* | 7/2014 | Zhu | H04B 5/02 455/41.1 |
| 2014/0292359 | A1* | 10/2014 | Akagi | G06F 3/044 324/705 |
| 2015/0151186 | A1* | 6/2015 | Czaja | A63C 5/075 701/36 |
| 2015/0199042 | A1* | 7/2015 | Standing | G06F 3/044 345/174 |

(Continued)

*Primary Examiner* — Ayodeji Ayotunde
*Assistant Examiner* — Max Mathew
(74) *Attorney, Agent, or Firm* — Terrile, Cannatti, Chambers & Holland, LLP; Robert W. Holland

(57) ABSTRACT

A portable information handling system multi-purposes a near field communication (NFC) antenna to detect object proximity of objects by interfacing a capacitive proximity processor with the NFC antenna and isolating the capacitive effects at the NFC antenna with a capacitive matching circuit disposed between the NFC antenna and an NFC transceiver. Comparison of the objects detected proximate the NFC antenna and proximate a conductive antenna provides a distinction of different types of objects, such as human forms versus a desktop.

18 Claims, 3 Drawing Sheets

(56) References Cited

U.S. PATENT DOCUMENTS

| | | | |
|---|---|---|---|
| 2015/0208422 A1* | 7/2015 | Park | H04W 72/082 |
| | | | 455/450 |
| 2015/0227338 A1* | 8/2015 | Hoshikawa | G06F 1/1698 |
| | | | 345/2.1 |
| 2015/0289143 A1* | 10/2015 | McHenry | H04W 16/14 |
| | | | 455/67.13 |
| 2016/0034140 A1* | 2/2016 | Navsariwala | G06F 3/044 |
| | | | 715/788 |
| 2016/0275483 A1* | 9/2016 | Zhou | G06Q 20/3278 |

* cited by examiner

INFORMATION HANDLING SYSTEM PROXIMITY SENSING

BACKGROUND OF THE INVENTION

Field of the Invention

The present invention relates in general to the field of information handling system wireless communication, and more particularly to information handling system proximity sensing.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems process information with processing components disposed in a portable housing. One type of portable housing is a laptop or convertible information handling system that integrates a display and keyboard in rotationally coupled housing portions. For example, the housing portions rotate relative to each other to open positions that exposed the keyboard and display for interaction with an end user. Another type of portable housing is planar housing that contains processing components in a flat space that is covered by a display. Examples of such planar housings are smartphone and tablet devices that generally accept end user inputs through a touchscreen display. Due to their small physical size, portable information handling systems often interface with external peripheral devices that accept and present information with a more user friendly footprint, such as external mechanical keyboards to accept keyed inputs and external display devices to present visual images in sizes that are greater than that available with an integrated display. In some instances, portable information handling systems have cabled communication with external peripheral devices, such as USB cables. Often, however, portable housings have limited room to include ports for external cables so that wireless communication is used to interface with external peripherals, such as IEEE 802.11 WiFi interfaces or Bluetooth interfaces.

Generally, portable information handlings are used on-the-go and include features targeted towards mobile users, such as simple web browsing and email interfaces. Smartphones in planar housings (and many tablets) include wireless wide area networking (WWAN) resources to interact with cellular telephone service provider networks. Advantageously, WWAN access allows end users to receive email and perform basic networking tasks, such as web surfing, in most locations where cellular service provides telephone access. If WiFi is available, such as through wireless local area network (WLAN) hotspot or other resources, portable information handling systems can select WLAN service over WWAN service in order to minimize wireless communication costs. As a result, at various times a portable information handling system may have multiple radios sending and receiving information through multiple antennae simultaneously. In addition, shorter range and lower bandwidth communications may be used, such as Bluetooth or near field communications (NFC) interfaces.

One difficulty with operating multiple radios at a portable information handling system is that government Specific Absorption Rate (SAR) regulations limit the amount of radiation emitted by radios located in close proximity to an end user. When radio power is reduced to meet SAR requirements, end user experience can be impacted, such as with lower data rates, greater error rates, and reduced service ranges. One way to increase radio transmission power is to detect the proximity of the end user and turn power down. Proximity detection provides an improved end user experience by supporting greater radio transmission power if a portable information handling system is not located proximate to an end user. Typically, a capacitive proximity sensor that detects changes in electrostatic charge is located proximate the transmitting antenna so that the radio can turn power down if an object is detected within a distance of the antenna that could lead to excessive radiation if the object is a human body part, such as the head. Although proximity sensors detect the presence of a human form near an antenna, proximity sensors generally do not distinguish between human forms and other objects. Thus, for example, when a portable information handling system rests on a desktop, its radio transmission power is reduced even though no human form is nearby that would absorb the radiation.

SUMMARY OF THE INVENTION

Therefore, a need has arisen for a system and method which provides a portable information handling system improved detection of objects and discernment between human and non-human objects.

In accordance with the present invention, a system and method are provided which substantially reduce the disadvantages and problems associated with previous methods and systems for detection of proximate objects and discernment between human and non-human objects. A near field antenna (NFC) is multi-purposed to provide NFC communication and capacitive proximity detection through a proximity processor coupled to the NFC antenna. A radio applies object detection associated with the NFC antenna to selectively set radio wireless signal transmission strength, such as to meet specific absorption goals.

More specifically, a portable information handling system processes information with processing components disposed in a planar housing, such as a tablet or smartphone form factor having a display disposed over front side and an NFC antenna disposed at a back side. A radio disposed in the housing provides wireless communication through a conductive antenna, such as wireless local area network (WLAN) or wireless wide area network (WWAN) communications. The radio transmits wireless signals at selective power settings based upon objects detected proximate to the conductive antenna, such as by reducing transmit strength to achieve specific absorption goals if a human form is detected within a predetermined distance. A proximity processor interfaces with the NFC antenna and measures electrostatic effects for capacitive proximity detection of objects proximate the NFC antenna. An NFC transceiver interfaces with the NFC antenna to support NFC communications. A capacitive matching network is disposed between the NFC antenna and NFC transceiver to provide an RF gap that isolates the NFC transceiver from electrostatic effects while supporting matched impedance for inductive wireless communications. The radio compares proximity of objects detected through the NFC antenna and through other proximity sensors to distinguish between objects relevant to power transmission and objects that are not relevant. For example, proximity data associated with the NFC antenna helps distinguish operational modes that require no transmit power reduction, such as when the information handling system is resting on a surface, limited transmit power reduction, such as when the information handling system is handheld, and more restrictive power reduction, such as when the information handling system is near a human head.

The present invention provides a number of important technical advantages. One example of an important technical advantage is that a near field communication (NFC) antenna is leveraged to also provide proximity detection. A proximity sensor interfaced with the NFC antenna performs capacitive proximity sensing with monitoring of electrostatic charge while an NFC transceiver provides communication with inductive current detection. The proximity and NFC functions of the NFC antenna are separated with an RF gap provide by a capacitive NFC matching circuit that isolates the NFC transceiver from the effects of changes to electrostatic charge. Monitoring proximity at the NFC antenna location provides an indication of the type of object that is proximate to the portable information handling system. For example, placing the NFC antenna side of the portable information handling system on a desktop provides an indication of proximity; while a lack of an object proximate the front face indicates that full radio power transmission may be used. Enhanced discernment of the type of object proximate the portable information handling system improves wireless communication performance by limiting transmission power restrictions to the situations where a human form is proximate the portable information handling system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An NFC antenna interfaces with a proximity processor for capacitive proximity object detection at the back surface of a portable information handling system housing. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
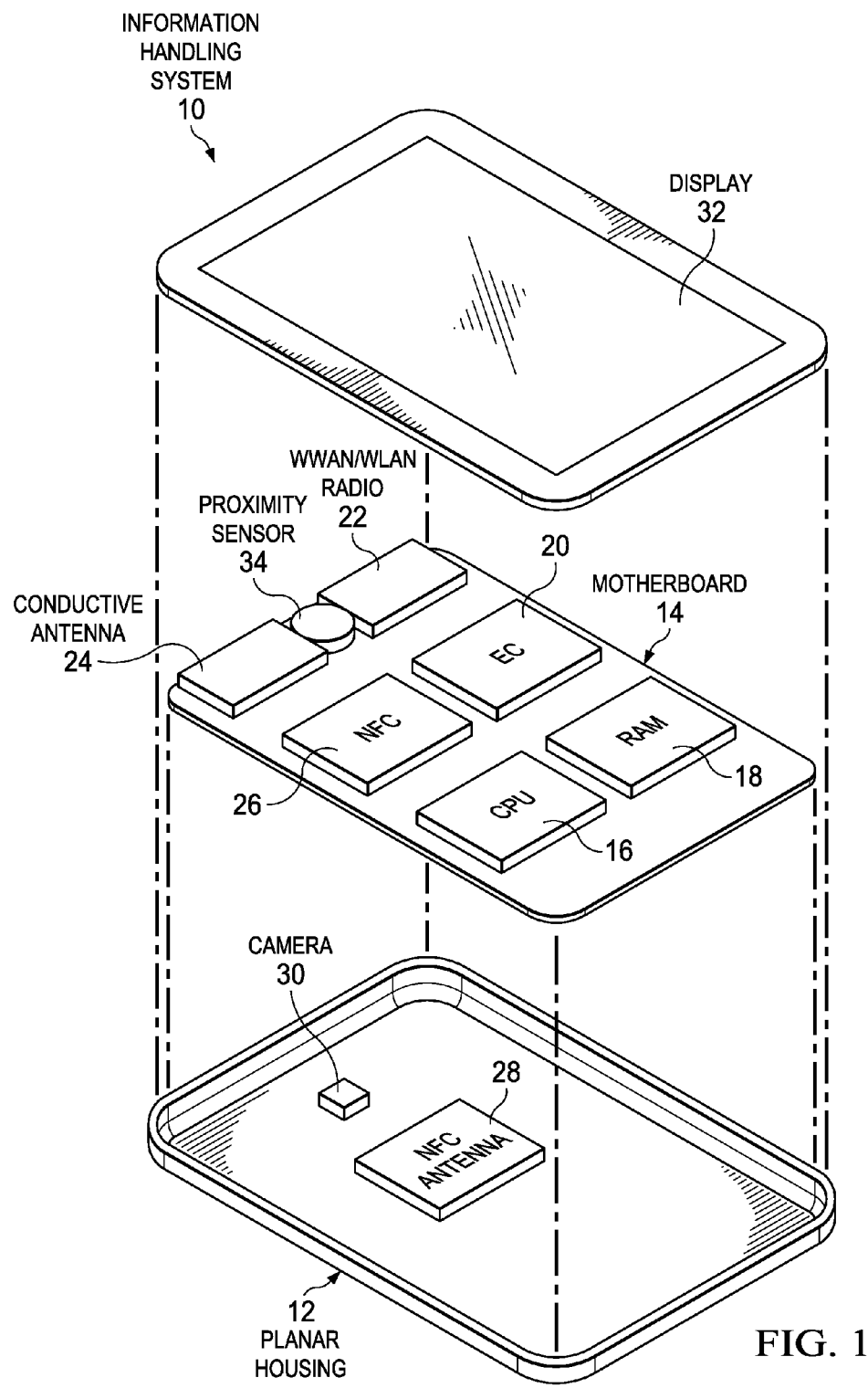
FIG. 1 depicts a blown-up view of a portable information handling system configured to detect object proximity with an NFC antenna.

Referring now to FIG. 1, a blown-up view depicts a portable information handling system 10 configured to detect object proximity with an NFC antenna 28. In the example embodiment, portable information handling system 10 has a tablet and/or smartphone configuration with processing components disposed in a planar housing 12. For example, a motherboard 14 couples to planar housing 12 and supports communication between a central processing unit (CPU) 16 and random access memory (RAM) 18 that cooperate to execute instructions to process information. An embedded controller 20 and other chipset components include flash memory storing firmware instructions, such as BIOS, which manages interaction of processing components, such as memory control and power. For example, embedded controller 20 coordinates operations between CPU 16 and a radio 22 to support wireless signal communication through a conduction antenna 24. In various embodiments, one or more radios 22 provide wireless communication through wireless wide area networks (WWANs), wireless local area networks (WLANs) and wireless personal area networks (WPANs). These and similar wireless signal communications generate wireless radio frequency signals through conductive effects of a current through a conductive antenna 26 so that the wireless signal travels over a relatively long distance, such as typical WWAN and WLAN network ranges.

In the example embodiment, motherboard 14 includes an NFC transceiver 26 that interfaces with an NFC antenna 28 located at the backside of planar housing 12 near a camera 30. NFC transceiver 26 communicates wireless signals using inductive effects of a current through NFC antenna 28 that interacts with an external NFC antenna through induction of the current. NFC communication has a limited range, such as a few inches, so that NFC antenna 28 is placed on the backside of planar housing 12 where an end user can conveniently hold it next to an external NFC device. When portable information handling system 10 is assembled, motherboard 14 inserts over planar housing 12 leaving NFC antenna 28 near the backside of planar housing 12, and display 32 inserts over motherboard 14 for viewing of information as visual images at the front side of portable information handling system 10. During use of portable information handling system 10 for NFC communication, NFC antenna 28 is held proximate the external NFC device by placing the backside of planar housing 12 against the external NFC device, leaving the display 32 at the front side of planar housing 12 available to interact with an end user for performing NFC inputs and viewing NFC outputs. In contrast, conductive antenna 24 may communicate wireless signals over longer ranges so that planar housing 12 may be in a number of different orientations relative to the end user during communication of the wireless signals. A proximity sensor 34 is placed proximate conductive antenna 24 to detect proximity of an end user during wireless communication so that the transmission power of radio 22 is managed to meet SAR goals. Proximity sensor 34 may use inductive or capacitive proximity sensing and provide information relating to detected objects to radio 22 so that radio 22 adjusts transmit power based on predetermined settings.

Figure 2:
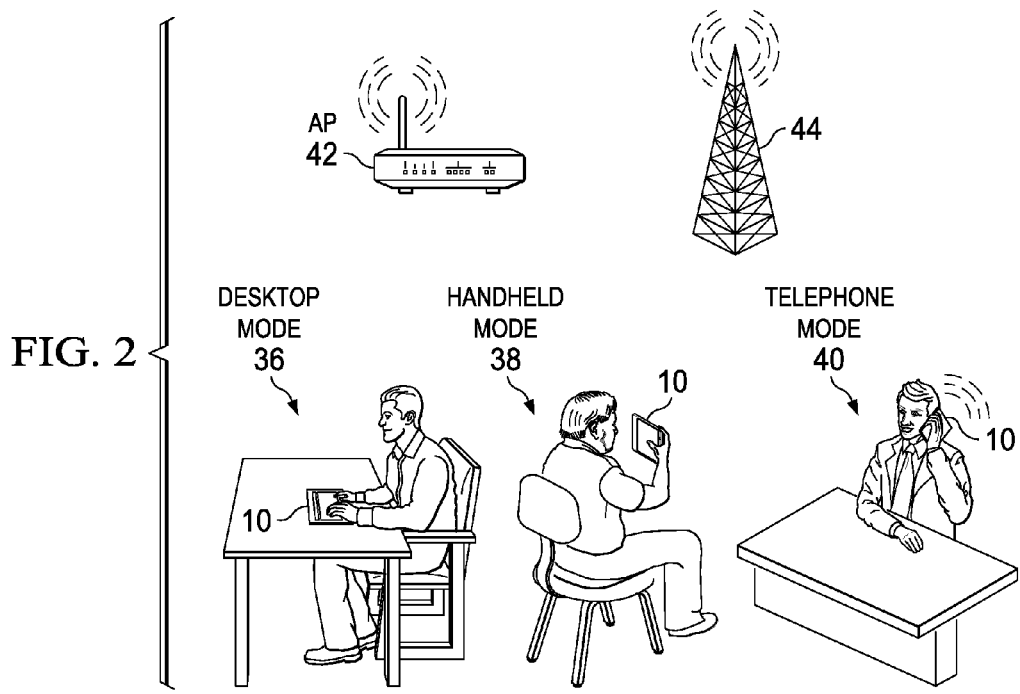
FIG. 2 depicts examples of information handling system operational modes with objects detected by proximity sensors.

Referring now to FIG. 2, examples are depicted of information handling system operational modes with objects detected by proximity sensors. In one example, portable information handling system 10 rests on a desktop surface 36 to communicate with a WLAN access point 42 and a WWAN tower 44. Since no human body parts are near portable information handling system 10, radios within planar housing 12 do not have to restrict their transmit power. In another example, portable information handling system 10 is in a handheld mode 38 with a user's hand placed around the backside of planar housing 12 and the display 32 held distal the user in a viewing mode. In handheld mode 38 some restrictions may exist for transmit strength of wireless signals from radio 22, however, SAR restrictions are typically less where the conductive antenna 24 is near a body part other than the head. In another example, portable information handling system 10 is held in a telephone mode with display 32 held against or near an end user's head to bring a speaker within earshot and a microphone near the user's mouth for performing a telephone call. Proximity sensor 34 detects proximity of the user's head and provides the proximity information to radio 22 for appropriate wireless signal transmission power adjustments. In other examples, portable information handling system 10 may be placed in other positions that have varying transmit power adjustments, such as in a user pocket, a carrying case, luggage, or in a stand that holds the display.

Proximity sensors 34 located next to conductive antenna 24 generally provide radio 22 with accurate information about objects proximate to the source of wireless signals, however, proximity sensor 34 has difficulty distinguishing the type of object that is proximate to conductive antenna 24. As a result, radio transmission strength from conductive antenna 24 is sometimes reduced based on object proximity detection where detected objects are not human and do not call for transmission power reduction. In order to aid in distinguishing the type of object that is proximate conductive antenna 24, NFC antenna 28 is multi-purposed to provide both NFC communication and object proximity detection. Thus, in the desktop mode 36, a constant large object placed proximate NFC antenna 28 is detected and provide to radio 22 as additional information to set transmit power. Similarly, in handheld mode 38 and telephone mode 40, detection of a hand across NFC antenna 28 provides additional information that, in combination with object detection by proximity sensor 34 aids radio 22 in distinguishing between proximate objects that indicate a transmit power reduction and objects that do not need a transmit power reduction.

In various embodiments, radio 22 adjusts transmit power in various ways based upon the type and power of the radio transmissions and a comparison of object detection relative to the NFC antenna and a conductive antenna having an associated proximity sensor. In addition, other sensors may be used as available, such as accelerometers and gyroscopes that indicate position and motion of planar housing 12, cameras that capture images of a user, and ambient light sensors that capture ambient light near planar housing 12. As an example, detection of an object behind planar housing 12 with NFC antenna 28 that is close proximity might indicate a desktop or a handgrip. If accelerations are detected, a handgrip may be indicated whereas a lack of accelerations may indicate a resting system. Similarly, a constant detection of an object in close proximity may indicate a non-human object while changes in proximity detected at NFC antenna 28 may indicate a human object with some associated movement. Comparison of the proximity detected at NFC antenna 28 and proximity detected at conduction antenna proximity sensor 28 helps to distinguish human and non-human objects by the similarities and differences of the object detection. The differences in proximity detection and the similarities distinguish human and non-human objects by the expected capacitance for different materials at the distances based upon the relative location of the NFC antenna and conductive antenna proximity sensor. For example, a close object at the NFC antenna that has variations in proximity and accelerations with a less close proximity at the conductive antenna proximity sensor may indicate a handheld mode 38. In contrast, a close proximity detected at both the NFC and conductive antenna may indicate a telephone mode 40. Other comparisons between NFC antenna proximity and conductive antenna proximity may be used based upon other types of situations, such as detecting an information handling system in a pocket, a briefcase or a carrying case.

Figure 3:
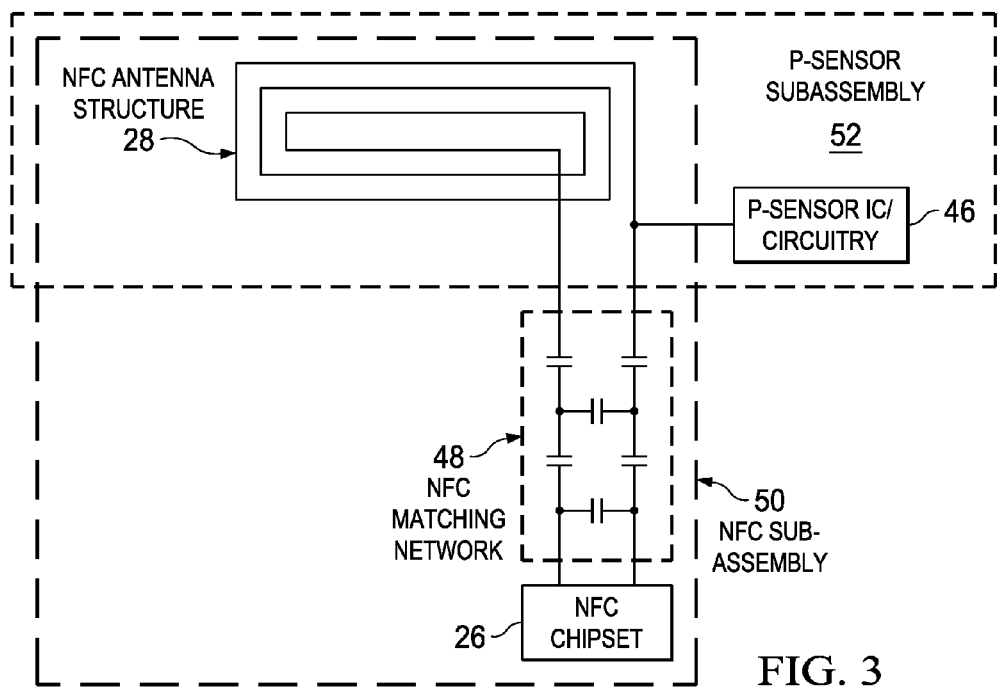
FIG. 3 depicts a circuit block diagram of an NFC antenna configured to detect objects within a proximity.

Referring now to FIG. 3, a circuit block diagram of an NFC antenna 28 configured to detect objects within a proximity. NFC antenna 28 interfaces with a proximity sensor processor 46 that determines object proximity with capacitance measurements of electrostatic effects resulting from object proximity. An NFC transceiver 26 interfaces with NFC antenna 28 to communicate wireless information with inductive effects at NFC antenna 28. An NFC matching network 48 is disposed between NFC transceiver 26 and NFC antenna 28 to match impedance for supporting NFC communication. NFC matching network 48 is built from capacitors to provide a dual purpose of matching NFC impedance and isolating electrostatic charge and capacitive effects related to proximity detection performed by proximity processor 46. In the example embodiment, only capacitors are used in matching network 48, however, in alternative embodiments alternative types of matching networks may be used in combination with other circuits that aid isolation of capacitive effects between NFC antenna 28 and NFC transceiver 26. As a result of the RF gap defined between NFC antenna 28 and NFC transceiver 26, an NFC subassembly 50 is defined to perform NFC communication and a separate proximity sensor subassembly 52 is defined to perform proximity detection with both NFC subassembly 50 and proximity sensor subassembly 52 sharing NFC antenna 28.

Figure 4:
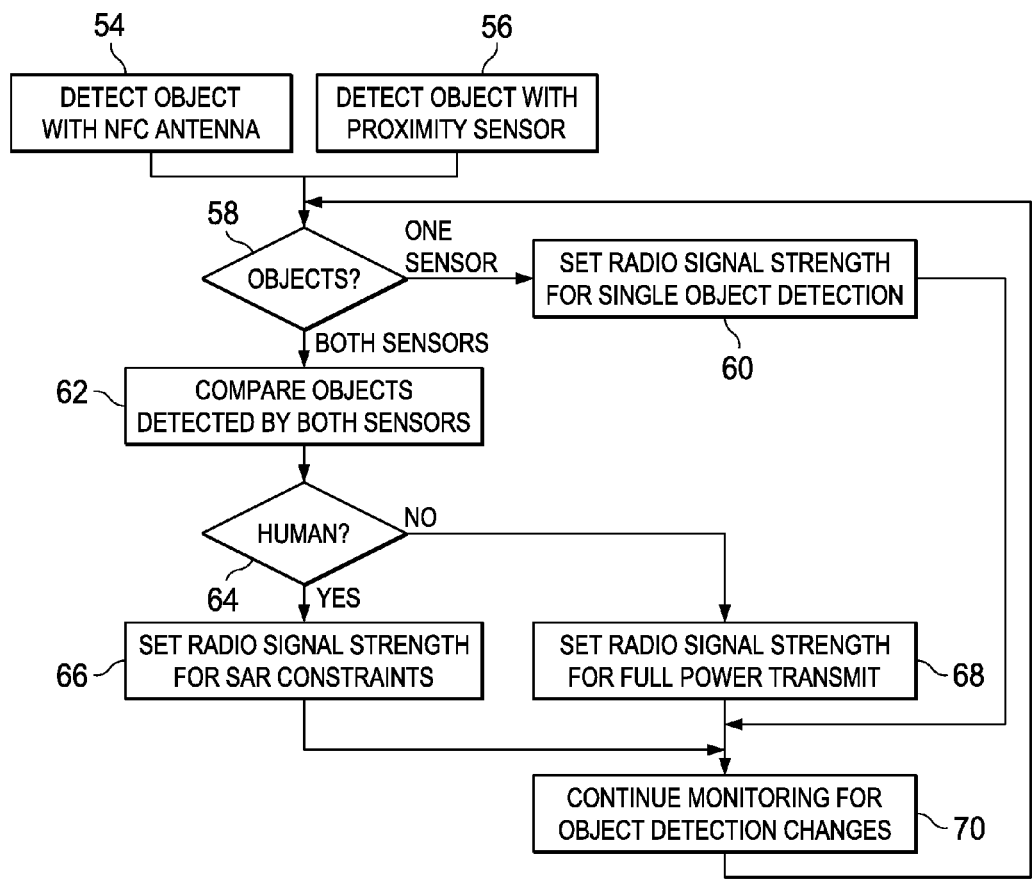
FIG. 4 depicts a flow diagram of a process for comparing objects detected proximate an NFC and conductive antenna.

Referring now to FIG. 4, a flow diagram depicts a process for comparing objects detected proximate an NFC and conductive antenna. The process starts at step 54 with proximity detection of an object at the NFC antenna and/or at step 56 with proximity detection of an object by a proximity sensor associated with a conductive antenna. Although the relative positions of the NFC antenna and the conductive antenna proximity sensor may vary in different types of information handling systems, distinguishing between types of objects will generally have better success where the relative positions are separated and positioned based on likely human touch points. At step 58, a determination is made of whether one or both proximity detectors detected an object. If only one sensor detected an object, the process continues to step 60 to set the radio transmit strength based upon a single sensor object detection. In such a case, the lack of an object detection at the other proximity sensor provides valuable information to the radio regarding the type of object and operating mode of the portable information handling system. For example, detection at just one proximity sensor indicates the system is laying on its back or on its display so that radio power transmit reduction may not be necessary as a human body part is not near the conductive antenna.

If at step 58 both proximity detectors have detected an object, the process continues to step 62 to compare the objects detected by both sensors. The comparison yields information relating to the actual location of a common object detected by both proximity sensors or, alternatively, an indication that the sensors detected different objects. For example, a constant proximity at the NFC antenna with a changing proximity at the conductive antenna may indicate that the portable information handling system is resting on a desktop surface and accepting touch inputs. Without proximity information from both sensors, the information handling system may instead have to conclude that the proximity of the desktop indicated a possible human object, resulting in an unnecessary reduction in transmit power. At step 64 a determination is made of whether detected touches are a human body, such as by comparing detected touches of both proximity detectors to a set of rules that associated detected touches with likely operating modes. If a human touch is detected, the process continues to step 66 to set the radio transmit signal strength to any SAR constraints that may exist for the operating mode. If at step 64 a human touch is not determined, the process continues to step 68 to set the radio transmit strength for full power transmit. At step 70, operational monitoring of detected touches continues to adjust radio transmit strength as appropriate.

Although the present invention has been described in detail, it should be understood that various changes, substitutions and alterations can be made hereto without departing from the spirit and scope of the invention as defined by the appended claims.

What is claimed is:

1. A portable information handling system comprising:
a planar housing;
a processor disposed in the planar housing and operable to execute instructions to process information;
a memory disposed in the planar housing and interfaced with the processor, the memory operable to store the information;
a display disposed in the planar housing and interfaced with the processor and memory, the display operable to present the information as visual images;
a radio disposed in the planar housing and interfaced with the processor, the radio operable to transmit wireless signals at selectable signal strengths with conductive effects;
a near field communication (NFC) transceiver disposed in the planar housing and interfaced with the processor, the NFC transceiver operable to transmit wireless signals;
an NFC antenna disposed in the planar housing and interfaced with the NFC transceiver to support NFC wireless signal communication with inductive effects; and
a proximity processor disposed in the planar housing and interfaced with the NFC antenna, the proximity detector operable to detect proximity of objects to the NFC antenna with capacitive effects, the proximity detector providing the proximity of objects to the radio for selecting signal strength.

2. The portable information handling system of claim 1 further comprising a matching circuit disposed between the NFC transceiver and the NFC antenna, the matching circuit having only capacitive elements.

3. The portable information handling system of claim 1 wherein the NFC antenna is disposed at a back side of the planar housing opposite a front side having the display.

4. The portable information handling system of claim 1 further comprising:
a conductive antenna interfaced with the radio and operable to communicate the wireless signals; and
a proximity sensor disposed proximate the conductive antenna and operable to detect proximity of objects relative to the conductive antenna, the proximity sensor providing the proximity of objects to the radio for selecting signal strength.

5. The portable information handling system of claim 4 further comprising an object analyzer interfaced with the radio and operable to compare proximity of objects from the proximity processor and the proximity sensor to select the signal strength.

6. The portable information handling system of claim 5 wherein detection of an object proximate the NFC antenna without detection of an object proximate the conductive antenna selects full signal strength.

7. The portable information handling system of claim 5 wherein detection of a constant object proximate the NFC detection with detection of a variable object proximate the conductive antenna selects signal strength based upon proximity of the object to the conductive antenna.

8. The portable information handling system of claim 5 wherein the conductive antenna comprises a wireless wide area network (WWAN) antenna.

9. A method for selecting radio signal strength at a portable information handling system, the method comprising:
interfacing a proximity processor with a near field communication (NFC) antenna;
monitoring electrostatic charge at the NFC antenna with the proximity processor to sense proximate objects by changes in capacitive effects at the NFC antenna; and
providing the sensed proximate objects to a radio to select signal strength transmitted by the radio, the radio sending wireless signals with conductive effects.

10. The method of claim 9 further comprising:
interfacing the NFC antenna with an NFC transceiver; and
isolating the NFC transceiver from the capacitive effects with a capacitive matching circuit disposed between the NFC antenna and the NFC transceiver.

11. The method of claim 10 further comprising:
monitoring proximity of objects to a conductive antenna that sends that radio signals at the radio signal strength with a proximity sensor disposed proximate the conductive antenna; and
selecting the radio signal strength at least in part by comparing the proximity of objects to the NFC antenna and the conductive antenna.

12. The method of claim 11 wherein the conductive antenna comprises a wireless local area network antenna.

13. The method of claim 11 wherein the conductive antenna comprises a wireless wide area network antenna.

14. The method of claim 11 wherein selecting the radio signal strength by comparing the proximity of objects further comprises comparing changes in proximity of objects to the NFC antenna and the conductive antenna as the proximity of objects changes over time.

15. A portable information handling system proximity detector comprising:
   a near field communication (NFC) antenna;
   an NFC transceiver interfaced with the NFC antenna and operable to perform NFC communications through the NFC antenna with inductive effects associated with the NFC antenna;
   a proximity processor interfaced with the NFC antenna and operable to perform proximity detection of objects proximate the NFC antenna with electrostatic effects associated with the NFC antenna;
   a capacitive matching circuit disposed between the NFC antenna and the NFC transceiver, the capacitive matching circuit isolating the NFC transceiver from the electrostatic effects;
   a radio operable to communicate wireless signals with conductive effects;
   a radio antenna disposed distal the NFC antenna and interfaced with the radio, the radio antenna operable to transmit and receive the wireless signals with the conductive effects; and
   a proximity sensor disposed proximate the radio antenna and interfaced with the radio, the radio operable to alter wireless signal strength based at least in part on objects detected by the proximity sensor.

16. The portable information handling system proximity detector of claim 15 wherein the radio interfaces with the proximity processor to alter wireless signal strength based at least in part on a comparison of objects detected proximate the NFC antenna.

17. The portable information handling system proximity detector of claim 16 wherein the radio comprises a wireless local area network radio.

18. The portable information handling system proximity detector of claim 16 wherein the radio comprises a wireless wide area network radio.

* * * * *